United States Patent
Jin et al.

(10) Patent No.: US 8,149,182 B2
(45) Date of Patent: Apr. 3, 2012

(54) DUAL-VIEW DISPLAY DEVICE AND METHOD OF DRIVING THE SAME

(75) Inventors: Hyun Suk Jin, Gyeonggi-do (KR); Ho Jin Ryu, Gyeonggi-do (KR); Sun Hwa Lee, Gyeonggi-do (KR); Hyung Seok Jang, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 1167 days.

(21) Appl. No.: 11/634,175

(22) Filed: Dec. 6, 2006

(65) Prior Publication Data

US 2008/0001849 A1 Jan. 3, 2008

(30) Foreign Application Priority Data

Jun. 28, 2006 (KR) .................. 10-2006-0058594

(51) Int. Cl.
*G09G 5/00* (2006.01)
*G09G 5/10* (2006.01)
*G02B 5/32* (2006.01)

(52) U.S. Cl. ............... 345/4; 345/3.1; 345/690; 359/15

(58) Field of Classification Search ............... 345/4–109
See application file for complete search history.

(56) References Cited

U.S. PATENT DOCUMENTS

| 7,423,651 | B2 * | 9/2008 | Chang et al. | 345/519 |
| 2006/0209371 | A1 * | 9/2006 | Hamagishi | 359/15 |
| 2008/0117233 | A1 * | 5/2008 | Mather et al. | 345/690 |
| 2009/0267868 | A1 * | 10/2009 | Takatani et al. | 345/1.3 |

FOREIGN PATENT DOCUMENTS

CN 1834729 A 9/2006

* cited by examiner

*Primary Examiner* — Alexander S Beck
*Assistant Examiner* — Charles V Hicks
(74) *Attorney, Agent, or Firm* — Morgan, Lewis & Bockius LLP

(57) ABSTRACT

A dual-view liquid crystal display device includes a display panel to display images; and a switching panel including first and second regions, the first and second regions controlled to represent a single image or different images displayed on the display panel, wherein a line width of the first region is adjustable. And, a method for driving a dual-view display device includes dividing the images displayed on the display panel in different directions by controlling a switching panel that includes first and second regions; and adjusting a line width of the first region in accordance with a viewing angle of a user.

13 Claims, 4 Drawing Sheets

DUAL-VIEW DISPLAY DEVICE AND METHOD OF DRIVING THE SAME

This application claims the benefit of the Korean Patent Application No. P2006-58594, filed on Jun. 28, 2006, which is hereby incorporated by reference as if fully set forth herein.

BACKGROUND OF THE INVENTION

1. Field of the Invention

The present invention relates to a display device, and more particularly, to a dual-view display device that can display more than one image simultaneously on a screen in accordance with a viewing angle, and a method of driving such dual-view display device.

2. Discussion of the Related Art

Flat display devices have attracted great attentions from many users. Currently, flat display devices include a liquid crystal display (LCD) that uses liquid crystal, a plasma display panel (PDP) that uses a discharge of inert gas, and an organic electroluminescence display (OLED) that uses an organic light-emitting diode. Among the flat display devices discussed above, the PDP is generally used for large-sized television, while the LCD is used for devices having various sizes, such as, a mobile phone, a portable computer, a monitor, a television, and other suitable devices.

The LCD uses optical and electric characteristics of liquid crystal molecules to display images. The liquid crystal has an anisotropic property such that a refractive index and a dielectric constant of the liquid crystal molecule along a major axis is different from the ones along a minor axis. This anisotropic property is used to control the arrangement and in turn the optical properties of the liquid crystal molecules. In other words, the LCD controls the light transmittance by varying the alignment direction of the liquid crystal molecules. The alignment direction of liquid crystal molecules are changed by an electric field.

An LCD device displays images through an LCD panel. The LCD panel is provided with a plurality of pixels arranged in a matrix-type configuration. Each pixel of the LCD panel is comprised of red, green, and blue sub-pixels. These sub-pixels control the light transmittance by varying the arrangement of liquid crystal molecules in accordance with a data signal, thereby representing desired colors. Each sub-pixel drives the liquid crystal molecules by charging a pixel electrode with a data signal supplied through a thin film transistor. In addition, a common voltage (i.e., differential voltage) is supplied to a common electrode to drive the liquid crystal molecules. Further, the LCD device requires a backlight unit to provide light to a rear surface of the LCD panel since the LCD panel is a non-light-emitting device.

Currently, a dual-view LCD device is being developed. The dual-view LCD device is adapted to provide a single-view mode and a dual-view mode. The dual-view mode displays two images on a display device based on one image data obtained from a left viewing angle and another image data obtained from a right viewing angle. The dual-view mode is achieved without causing the interference between the two images. The single-view mode displays a single image on the display device, where the single image is obtained from entire-viewing angles. The desired LCD display mode may be selected. Furthermore, method of selecting between the single-view mode and the dual-view mode may also be applied to the various other flat panel display devices, such as the OLED, Electric Field emission display FED, PDP, and other suitable display devices.

SUMMARY OF THE INVENTION

Accordingly, the present invention is directed to a dual-view display device and a method of driving the same that substantially obviates one or more problems due to limitations and disadvantages of the related art.

An object of the present invention is to provide a dual-view liquid crystal display (LCD) device and a method of driving the same that displays more than one image simultaneously on a screen in accordance with a viewing angle without causing the interference phenomena between the images.

Another object of the present invention is to provide a dual-view LCD device that is switch-able between a signal-view mode and a dual-view mode.

Additional features and advantages of the invention will be set forth in part in the description which follows, and in part will be apparent from the description, or may be learned by practice of the invention. The objectives and other advantages of the invention will be realized and attained by the structure particularly pointed out in the written description and claims hereof as well as the appended drawings.

To achieve these objects and other advantages and in accordance with the purpose of the invention, as embodied and broadly described, the dual-view display device and method of driving the same includes a display panel to display images; and a switching panel including first and second regions, the first and second regions controlled to represent a single image or different images displayed on the display panel, wherein a line width of the first region is adjustable.

In another aspect, a method for driving a dual-view display device includes dividing the images displayed on the display panel in different directions by controlling a switching panel that includes first and second regions; and adjusting a line width of the first region in accordance with a viewing angle of a user.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. In particular, a dual-view liquid crystal display (LCD) device and a method for driving the same according to the present invention will be explained with reference to the accompanying drawings.

Figure 1:
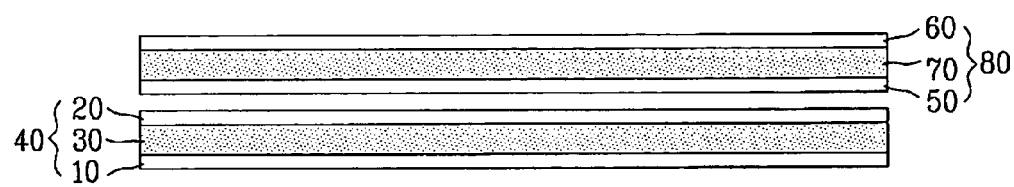
FIG. 1 is a cross sectional view illustrating a dual-view liquid crystal display (LCD) device according to a first exemplary embodiment of the present invention.

FIG. 1 is a cross section view illustrating a dual-view LCD device according to a first exemplary embodiment of the present invention. As shown in FIG. 1, the first exemplary dual-view LCD device includes an LCD panel 40 to display images and a switching panel 80 to select between a single-view mode and a dual-view mode.

The LCD panel 40 is provided with a first upper substrate 20, a first lower substrate 10, a first liquid crystal layer 30 formed in a cell gap between the first lower and upper substrates 10 and 20, and a spacer (not shown) to maintain the cell gap between the first lower and upper substrates 10 and 20. The first upper substrate 20 and the first lower substrate 10 are bonded to the first liquid crystal layer 30 by a sealant.

The first lower substrate 10 includes a thin film transistor array formed on a lower insulating substrate. The thin film transistor array is provided with gate and data lines formed perpendicularly to each other and define a plurality of sub-pixel regions. The thin film transistors are each connected to a gate line and a data line to drive each sub-pixel region. Pixel electrodes are formed in the respective sub-pixel regions and connected to the thin film transistors. In addition, the thin film transistor array may include a common electrode that forms an electric field with the pixel electrode to drive the first liquid crystal layer 30.

The first upper substrate 20 includes a color filter array formed on an upper insulating substrate. The color filter array includes a black matrix that divides the first upper substrate 20 into sub-pixel regions. A color filter of red (R), green (G), or blue (B) is formed in each sub-pixel region. Alternatively, the color filter array may be formed on the first lower substrate 10. If the common electrode is not formed on the first lower substrate 10, the common electrode may be formed on the color filter array.

In addition, alignment layers are formed on the surfaces of the first lower and upper substrates 10 and 20 that face the first liquid crystal layer 30. The alignment layers are in contact with the first liquid crystal layer 30 to establish an initial alignment state of liquid crystal molecules in the first liquid crystal layer 30. A column spacer (not shown) is provided on the first lower substrate 10 or the first upper substrate 20 to maintain the cell gap. The first liquid crystal layer 30 is formed on the first lower substrate 10 or the first upper substrate 20 by a liquid crystal dispensing method. Thereafter, the first lower substrate 10 and the first upper substrate 20 are bonded together with a sealant. Alternatively, the first liquid crystal layer 30 may be formed in the cell gap by a liquid crystal injection method after the first lower substrate 10 and the first upper substrate 20 are bonded. Instead of the column spacer, a ball spacer may be dispersed on either substrate before injecting the liquid crystal.

The LCD panel 40 is provided with a pixel matrix including a plurality of pixels. The pixel matrix controls the transmittance of light provided from a backlight unit to display desired images. Each pixel is formed of R, G, and B sub-pixels to control the transmittance of light by varying the arrangement of liquid crystal molecules in accordance with an applied data signal. Each sub-pixel is charged with a differential voltage; the voltage. That is voltage of a data signal supplied to the pixel electrode and the common voltage supplied to the common electrode are different, thereby varying the arrangement of liquid crystal molecules.

Although not shown, the LCD panel 40 includes a first pixel line formed of a plurality of first pixels arranged in a vertical direction, and a second pixel line formed of a plurality of second pixels arranged in the vertical direction. The first and second pixel lines are alternately arranged in a horizontal direction. The LCD panel 40 is adapted to display the images in a single-view or dual-view mode. In the single-view mode, the data signals corresponding to one image are supplied to the first and second pixel lines. In the dual-view mode, the data signal corresponding to a first image is supplied to the first pixel line, and the data signal corresponding to a second image is supplied to the second pixel line.

Figure 5:
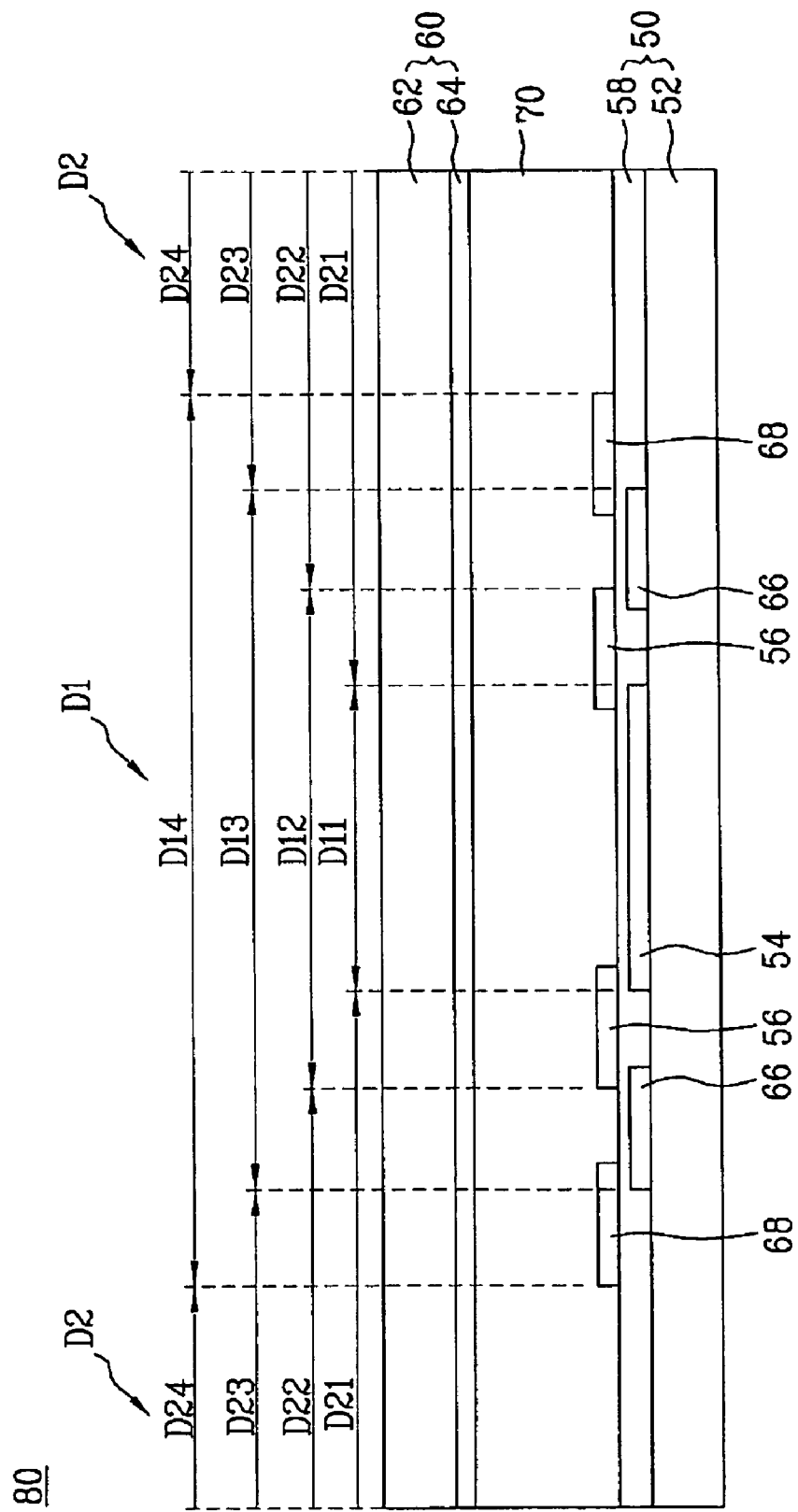
FIG. 5 is a cross sectional side view illustrating a lower substrate of a switching panel of a dual-view LCD device according to the second exemplary embodiment of the present invention.

FIG. 5 describes an exemplary switching panel 80. The switching panel 80 is provided with a second upper substrate 60, a second lower substrate 50, a second liquid crystal layer 70 formed in a cell gap between the second upper substrate 60 and the second lower substrate 50, and a spacer (not shown) to maintain the cell gap between the second lower and upper substrates 50 and 60. The second upper substrate 60 and the second lower substrate 50 are bonded to each other.

In addition, a plurality of electrodes are provided on the second lower and upper substrates 50 and 60 to drive the LCD panel, and a blocking region and a transmitting region are defined. The switching panel 80 combined with the LCD panel 40 allows for selection between a single-view mode and a dual-view mode. In the single-view mode, no voltage is applied to the switching panel 80, thereby maintaining the switching panel 80 in a normal white mode. At the same time, the LCD panel 40 is maintained in a transmitting mode and displays one image. In the dual-view mode, some regions of the switching panel 80 are adapted to become blocking regions by applying a voltage thereto, while the other regions become transmitting regions. Accordingly, the first and second images displayed on the LCD panel 40 are transmitted through the transmitting regions of the switching panel 80, and the first and second images of the left and right viewing angle regions are displayed.

Figure 2:
FIG. 2 is a schematic view illustrating an exemplary driving method according to the first exemplary embodiment of the present invention.
Figure 2:
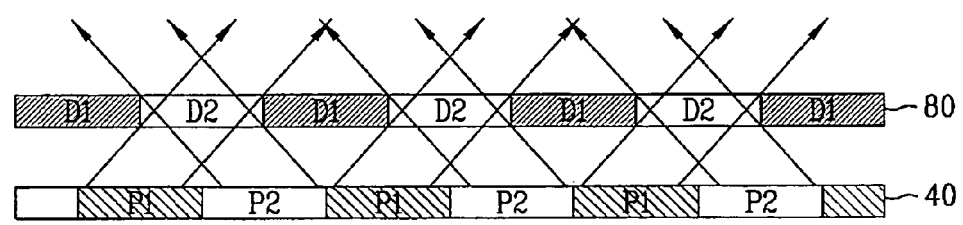

FIG. 2 is a schematic view of illustrating an exemplary driving method according to the first exemplary embodiment of the present invention. In the LCD panel 40, the first and second pixels P1 and P2 are alternately arranged in the horizontal direction. A plurality of the first and second pixels P1 and P2 are formed in a line in the vertical direction, thereby forming a plurality of first pixel lines PL1 including a plurality of first pixels P1 and a plurality of second pixel lines PL2 including a plurality of second pixels P2. In the switching panel 80, the blocking region D1 and the transmitting region D2 are alternately arranged in the horizontal direction, where a voltage is applied to the blocking region D1 and no voltage is applied to the transmitting region D2. Similar to the pixel lines PL1 and PL2, each of the blocking region D1 and the transmitting region D2 are formed in a line in the vertical direction.

As shown in FIG. 2, the border between the blocking region D1 and the transmitting region D2 overlaps the center of the first pixel P1 or the second pixel P2. The blocking region D1 and the transmitting region D2 may have the same horizontal-direction pitch (i.e., line width), or have different horizontal-direction pitches. Similarly, the first and second pixels P1 and P2 may have the same horizontal-direction pitch, or have different horizontal-direction pitches. The pitch of the blocking region D1 and the transmitting region D2 is independently determined based on the viewing angle.

In the dual-view mode, the data signal of the first image A is supplied to the first pixels P1 of the LCD panel 40, and the data signal of the second image B is supplied to the second pixels P2 of the LCD panel 40. At this time, the voltage is applied only to the blocking region D1 of the switching panel 80, and no voltage is applied to the transmitting region D2 of the switching panel 80. As an example, the first image A of the first pixels P1 is displayed through the transmitting region D2 of the switching panel 80 in a right-side viewing angle direction. While, the second image B of the second pixels P2 is displayed through the transmitting region D2 of the switching panel 80 in a left-side viewing angle direction. In other words, the first image A of the first pixels P1 positioned in a first side of the transmitting region D2 of the switching panel 80 is transmitted to a second side, and the second image B of the second pixels P2 positioned in the second side of the transmitting region D2 of the switching panel 80 is transmitted to the first side. Accordingly, the first and second images A and B displayed on the LCD panel 40 are divided into left/right-side viewing angle regions.

Figure 3:
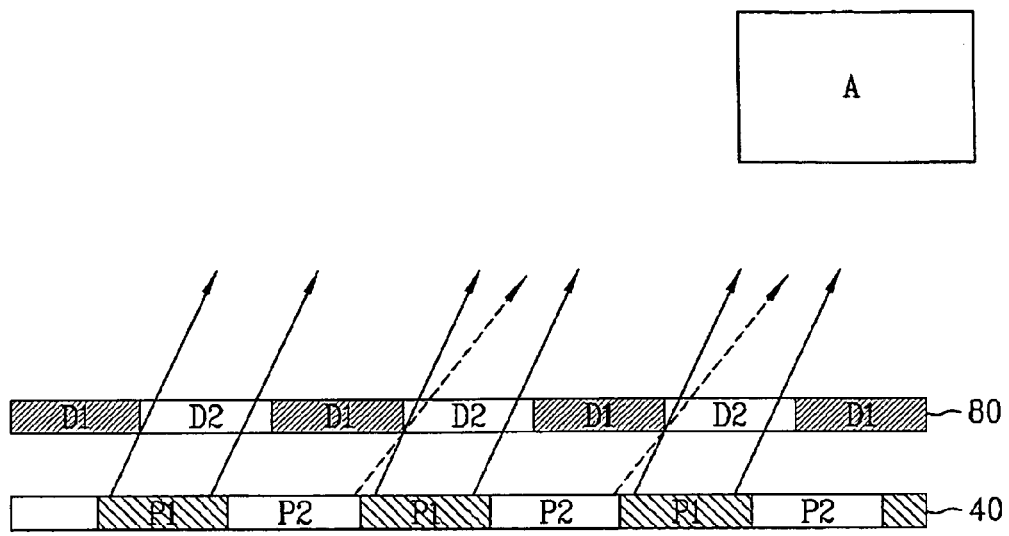
FIG. 3 is a schematic view illustrating an image-interference phenomenon generated in the dual-view LCD device of FIG. 2.

In this case, the interference between the first and second images A and B may occur based on the viewing position of the user. In particular, as shown in FIG. 3, the first image A of the first pixels P1 is displayed through the transmitting region D2 to the right-side viewing angle region. If the position of user changes, for example, the user moves in the direction of increasing the right-side viewing angle with respect to the vertical central axis, the second image B of the second pixels P2 may show through the transmitting region D2 in the right-side viewing angle region, thereby generating an interference phenomenon.

Figure 4:
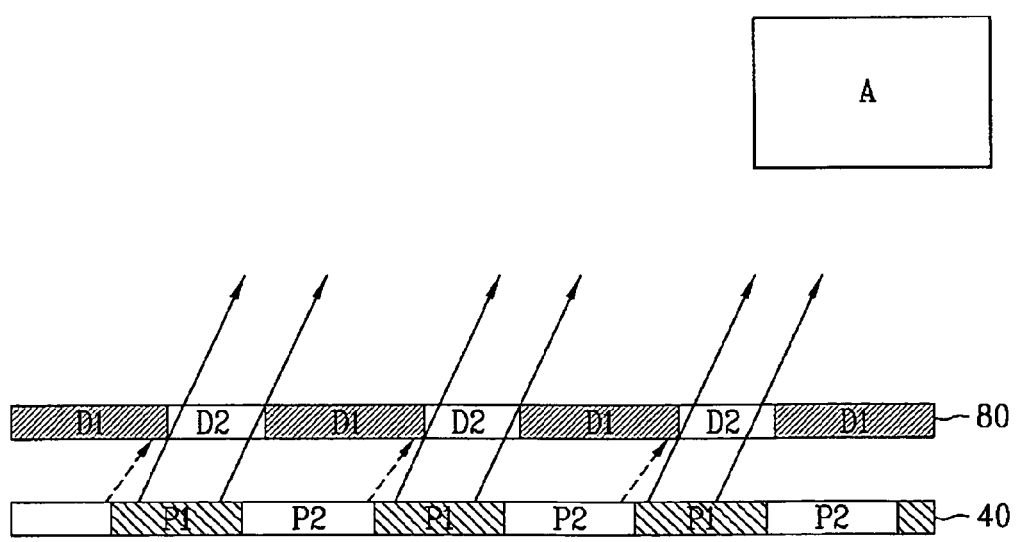
FIG. 4 is a schematic view illustrating an exemplary driving method according to a second exemplary embodiment of the present invention.

In order to eliminate the interference phenomenon, a dual-view LCD device according to a second exemplary embodiment includes blocking regions D1 having adjustable line widths based on the viewing angle of the user. For example, as shown in FIG. 4, if the position of user changes in the direction of increasing right-side viewing angle in the right-side viewing angle region, the line width of the blocking region D1 is increased. An amount of line width increased or decreased between the blocking regions D1 and the transmitting regions D2 is inversely proportional to each other. Accordingly, by increasing the line width of the blocking regions D1, it is possible to prevent the interference phenomena.

Figure 6:
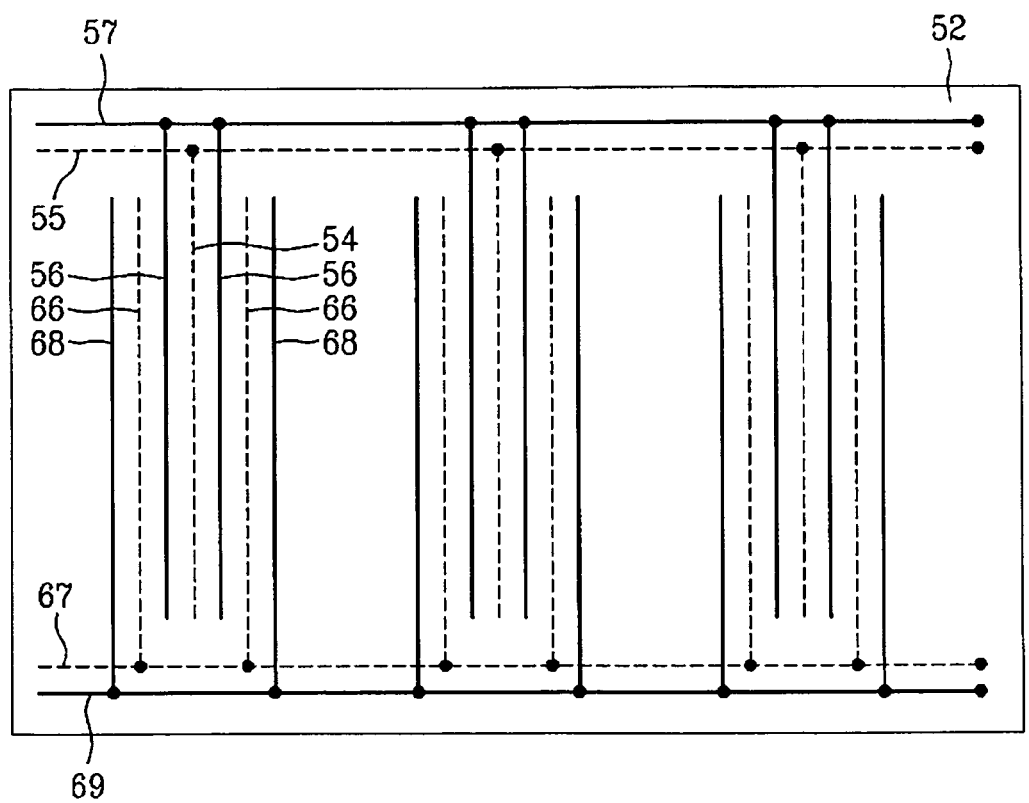
FIG. 6 is a cross sectional top view illustrating an exemplary lower substrate of FIG. 5.

FIG. 5 illustrates a cross sectional side view of a lower substrate of a switching panel 80 according to an exemplary dual-view LCD device of the second exemplary embodiment. FIG. 6 is a cross sectional top view illustrating an exemplary lower substrate of FIG. 5. As shown in FIG. 5, a second lower substrate 50 of a switching panel 80 includes a plurality of electrodes 54, 56, 66, and 68 arranged separately on a lower insulating substrate 52. A second upper substrate 60 includes a common electrode 64 formed on an upper insulating substrate 62. The common electrode 64 is formed of a transparent conductive layer. The common electrode 64 supplies a common voltage that serves as a reference voltage when driving a liquid crystal layer 70 of the switching panel 80.

The second lower substrate 50 includes the lower insulating substrate 52, a main electrode 54 formed on the lower insulating substrate 52, a pair of auxiliary electrodes 66 formed near the main electrode 54 on the lower insulating substrate 52, an insulating layer 58 formed on the lower insulating substrate 52 including the main electrode 54 and the pair of auxiliary electrodes 66, and a plurality of auxiliary electrode parts 56 and 68 formed on the insulating layer 58. First auxiliary electrodes 56 form one electrode pair, Second auxiliary electrodes 66 form another electrode pair, and third auxiliary electrodes 68 form yet another electrode pair. Each of the first to third auxiliary electrodes 56, 66, and 68 are formed in the periphery of the main electrode 54 and each auxiliary electrode is insulated from the main electrode 54. The main electrode 54 and the auxiliary electrodes 56, 66, and 68 are formed of transparent conductive layers. When an on-voltage is supplied to the main electrode 54, an electric field is generated between the common electrode 64 and the main electrode 54. As a result, the liquid crystal layer 70 between the main electrode 54 and the common electrode 64 is switched to the blocking mode by the generated electric field, thereby forming the blocking region D1.

As shown in FIG. 5, the line width of D1 may be increased in increments. Under the control of the user, the on-voltage is selectively supplied to selected pair of first to third auxiliary electrodes 56, 66, and 68. When the on-voltage is supplied to the pair of first auxiliary electrodes 56, the standard line width D11 becomes D12. D11 corresponds to the line width of the main electrode 54. Similarly, when the on-voltage is supplied to the pairs of first and second auxiliary electrodes 56 and 66, the standard line width D11 becomes D13. Further, in case of the pairs of first to third auxiliary electrodes 56, 66, and 68, the standard line width D11 becomes D14 to maximize the line width of the blocking region D1. In addition, as shown in FIG. 5, the amount of line width increased on both sides of the standard line width D11 are equal. Thus, it is possible to prevent the image interference in the left/right-side viewing angle regions.

In the second lower substrate 50, portions without a main electrode and the first to third auxiliary electrodes 56, 66, and 68 when no on-voltage is supplied are set as the transmitting region D2. In this case, the off-voltage, which is equal to the common voltage, may be applied to the auxiliary electrodes 56, 66, and 68 to form the transmitting region D2. That is, no electric field is generated between the common electrode 64 and the auxiliary electrodes 56, 66, and 68. Thus, the transmitting region D2 of the liquid crystal layer 70 is maintained in the transmitting mode.

As shown in FIG. 5, the main electrode 54 is formed on the lower insulating substrate 52. Then, the pair of second auxiliary electrodes 66 is formed in symmetry with respect to the main electrode 54 on the lower insulating substrate 52. The insulating layer 58 is formed over the main electrode 54 and the pair of second auxiliary electrodes 66. Then, the pair of first auxiliary electrodes 56 and the pair of the third auxiliary electrodes 68 are formed over the insulating layer 58 in symmetry with respect to the main electrode 54. In the arrangement as shown in FIG. 5, one edge of the main electrode 54 overlaps with one edge of one of the pair of first auxiliary electrodes 56. Similarly, another edge of the main electrode 54 overlaps with one edge of the other one of the first auxiliary electrodes 56. In case of the first auxiliary electrode 56, one edge of the first auxiliary electrode 56 overlaps with one edge of the main electrode 54 and the other edge of the first auxiliary electrode 56 overlaps with one edge of the adjacent second auxiliary electrode 66, and so on. In the second exemplary embodiment, respective electrodes are partially overlapped each other to prevent light leakage caused by misalignment of liquid crystal panel 40 and the switching panel 80 in the blocking region D1.

In the second exemplary embodiment, a standard line width D11 of the blocking region D1 is a width of the main electrode 54 and is relatively large. The line width of each of the first to third auxiliary electrodes 56, 66, and 68 is smaller than the standard line width D11. Furthermore, each pair of the first to third auxiliary electrodes 56, 66, and 68 are formed in symmetry with respect to the main electrode 54, thereby allowing the line width D1 to increase incrementally.

In detail, when the on-voltage is applied only to the main electrode 54, the line width of the blocking region D1 is set as D11, and the line width of the transmitting region D2 is set as D21 since the off-voltage is supplied to the first to third auxiliary electrodes 56, 66, and 68. If the on-voltage is applied to the main electrode 54 and the pair of first auxiliary electrodes 56, the line width of the blocking region D1 is increased to D12, and the line width of the transmitting region D2 is decreased to D22. Similarly, if the on-voltage is applied to the main electrode 54 and the first and second auxiliary electrodes 56 and 66, the line width of the blocking region D1 is increased to D13, and the line width of the transmitting region D2 is decreased to D23, and so on. In the single-view mode, either no voltage is applied to the main electrode 54 and the first to third auxiliary electrodes 56, 66, and 68, or the voltage that is equal to the common voltage is applied to the main electrode 54 and the first to third auxiliary electrodes 56, 66 and 68. Accordingly, no electric field is generated between the main and the auxiliary electrodes 54, 56, 66, and 68 and the common electrode 64, thereby maintaining the switching panel 80 in the transmitting mode.

As shown in FIG. 6, the main electrode 54 and the first to third auxiliary electrodes 56, 66, and 68 are formed as a vertical line on the lower insulating substrate 52. The main electrode 54 and the first to third auxiliary electrodes 56, 66, and 68 are supplied with voltage through the separate supplying lines 55, 57, 67, and 69. The main electrode 54 and the first to third auxiliary electrodes 56, 66, and 68 are same line type.

The main electrodes 54 formed on the lower insulating substrate 52 are commonly connected with the main supplying line 55. As shown in FIG. 6, the main supplying line 55 and first supplying line 57 are positioned at the top of the lower insulating substrate 52. Second supplying line 67 and third supplying line 69 are positioned at the bottom of the lower insulating substrate 52. The pairs of first auxiliary electrodes 56 are formed commonly connected to the first auxiliary supplying line 57. The pairs of second auxiliary electrodes 66 are formed commonly connected to the second auxiliary supplying line 67. The pairs of the third auxiliary electrodes 68 are formed commonly connected to the third auxiliary supplying line 69. As described earlier, one edge of one first auxiliary electrode 56 overlaps one edge of the main electrode 54 and one edge of another first auxiliary electrode 56 overlaps another edge of the main electrode 54, and so on.

In the dual-view mode of the exemplary dual-view LCD device, the pair of the auxiliary electrodes 56, 66, and 68 are separately and symmetrically arranged with respect to the main electrode 54 of the switching panel 80 in accordance with the viewing angle of the user. In this state, the pairs of the auxiliary electrodes are selectively controlled to adjust the line width of the blocking region (D1). Accordingly, it is possible to prevent the image interference caused by the position change of user in the left/right-side viewing angle regions.

As mentioned above, the dual-view LCD device according to the present invention and the method for driving the same have the following advantages. In the exemplary dual-view LCD device of the present invention, the single-view mode or the dual-view mode can be selected. The single-view mode enables displaying one image in all viewing angle regions. The dual-view mode enables displaying different images on the LCD panel (i.e., left and right viewing angle regions) by controlling the line width of the blocking region of the switching panel disposed over the LCD panel.

It will be apparent to those skilled in the art that various modifications and variations can be made in the dual-view display device and method for driving the same of the present invention without departing from the spirit or scope of the inventions. Thus, it is intended that the present invention cover the modifications and variations of this invention provided they come within the scope of the appended claims and their equivalents.

What is claimed is:

1. A dual-view liquid crystal display device, comprising:
a display panel to display images; and
a switching panel including first and second regions arranged alternately in a direction, the first and second regions controlled to represent a single image displayed on the display panel in a single-view mode and different images displayed on the display panel in a dual-view mode,
wherein a line width of the first region is adjustable in accordance with a viewing angle of a user,
wherein one of the first and second regions is controlled in a transmitting mode and the other is controlled in a blocking mode when in the dual-view mode, both the first and second regions of the switching panel being simultaneously controlled in a transmitting mode to transmit the single image displayed on the display panel through the switching panel when in the single-view mode,
wherein the switching panel includes:
a first substrate,
a second substrate,
a liquid crystal layer formed between the first and second substrates,
a common electrode formed of transparent electrode on the first substrate,
a main electrode formed of transparent electrode on the second substrate to drive the first region, and
at least a pair of auxiliary electrodes formed of transparent electrode in the periphery of the main electrode on the second substrate to adjust the line width of the first region, the pair of auxiliary electrodes being arranged in symmetry with respect to the main electrode,
wherein a width of each auxiliary electrode is smaller than a width of the main electrode,
wherein the main electrode are insulated from adjacent auxiliary electrodes, such that one edge of the main electrode overlaps one edge of one of the adjacent auxiliary electrodes and another edge of the main electrode overlaps one edge of another one of the adjacent auxiliary electrodes, and
wherein the each of the auxiliary electrodes is insulated from an adjacent auxiliary electrode, such that one edge of one of the auxiliary electrodes overlaps one edge of the adjacent auxiliary electrode and one edge of another one of the auxiliary electrodes overlaps one edge of another adjacent auxiliary electrode.

2. The dual-view liquid crystal display device of claim 1, wherein the display panel includes a first pixel line provided with a plurality of first pixels, and a second pixel line provided with a plurality of second pixels, the first and second pixel lines arranged alternately in a horizontal direction.

3. The dual-view liquid crystal display device of claim 2, wherein the switching panel includes the first and second regions arranged alternately in a line in a same direction as the first and second pixel lines.

4. The dual-view liquid crystal display device of claim 3, wherein:

the first pixel lines of the display panel represent the first image; and the second pixel lines of the display panel represent the second image when in the dual-view mode.

5. The dual-view liquid crystal display device of claim 4, wherein:

the first region is adapted to be switched between the blocking mode and the transmitting mode based on whether a driving voltage is selectively applied; and the second region is maintained in the transmitting mode.

6. The dual-view liquid crystal display device of claim 5, wherein the line width of the first region in the switching panel is adjustable by controlling where the driving voltage is applied on the switching panel.

7. The dual-view liquid crystal display device of claim 6, wherein the line width of the first region is inversely proportional to a line width of the second region, such that an amount of line width increased in the first region corresponds to an amount of line width decreased in the second region, or an amount of line width decreased in the first region corresponds to an amount of line width increased in the second region.

8. The dual-view liquid crystal display device of claim 1, wherein the switching panel includes:

a first supplying line to supply the driving voltage to the main electrode; and a plurality of second supplying line to separately supply the driving voltage to the pair of the auxiliary electrodes.

9. The dual-view liquid crystal display device of claim 1, wherein the display panel is formed of any one of: a liquid crystal display panel, a plasma display panel, an organic electroluminescence display panel, and an electric-field emission display panel.

10. A method for driving a dual-view display device, the method comprising:

displaying images on a display panel;

dividing the images displayed on the display panel in different directions by controlling a switching panel that includes first and second regions arranged alternately in a direction when in a dual-view mode;

displaying a single image on a display panel;

representing the single image displayed on the display panel by controlling a switching panel that includes first and second regions in a single-view mode; and adjusting a line width of the first region in accordance with a viewing angle of a user, wherein one of the first and second regions is controlled in a transmitting mode and the other is controlled in a blocking mode when in the dual-view mode, both the first and second regions being simultaneously controlled in a transmitting mode to transmit the single image displayed on the display panel through the switching panel when in the single-view mode, wherein the switching panel includes:

a first substrate and a second substrate, a liquid crystal layer formed between the first and second substrates, a common electrode formed of transparent electrode on the first substrate, a main electrode formed of transparent electrode on the second substrate to drive the first region, and at least a pair of auxiliary electrodes formed of transparent electrode in the periphery of the main electrode on the second substrate to adjust the line width of the first region, the pair of auxiliary electrodes being arranged in symmetry with respect to the main electrode, wherein a width of each auxiliary electrode is smaller than a width of the main electrode, wherein the main electrode are insulated from adjacent auxiliary electrodes, such that one edge of the main electrode overlaps one edge of one of the adjacent auxiliary electrodes and another edge of the main electrode overlaps one edge of another one of the adjacent auxiliary electrodes, and wherein the each of the auxiliary electrodes is insulated from an adjacent auxiliary electrode, such that one edge of one of the auxiliary electrodes overlaps one edge of the adjacent auxiliary electrode and one edge of another one of the auxiliary electrodes overlaps one edge of another adjacent auxiliary electrode.

11. The method of claim 10, wherein:

a first image is displayed on the display panel by a plurality of first pixels; and a second image is displayed by a plurality of second pixels.

12. The method of claim 11, wherein:

the first region of the switching panel is maintained in a blocking mode; and the second region is maintained in a transmitting mode when in the dual-view mode.

13. The method of claim 12, wherein the line width of the first region is adjusted by applying a voltage.

* * * * *